US008842532B2

(12) United States Patent
Seok

(10) Patent No.: US 8,842,532 B2
(45) Date of Patent: *Sep. 23, 2014

(54) METHOD AND DEVICE FOR TRANSMISSION OPPORTUNITY TRUNCATION

(75) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 281 days.

This patent is subject to a terminal disclaimer.

(21) Appl. No.: 13/527,368

(22) Filed: Jun. 19, 2012

(65) Prior Publication Data

US 2012/0257612 A1   Oct. 11, 2012

Related U.S. Application Data

(63) Continuation of application No. 12/473,799, filed on May 28, 2009, now Pat. No. 8,223,639.

(60) Provisional application No. 61/118,998, filed on Dec. 1, 2008, provisional application No. 61/157,197, filed on Mar. 3, 2009.

(30) Foreign Application Priority Data

May 11, 2009   (KR) .................. 10-2009-0040885

(51) Int. Cl.
*H04L 12/26*   (2006.01)
*H04W 74/08*   (2009.01)
*H04W 74/00*   (2009.01)

(52) U.S. Cl.
CPC ........ *H04W 74/0816* (2013.01); *H04W 74/002* (2013.01)
USPC ...................................... 370/230

(58) Field of Classification Search
None
See application file for complete search history.

(56) References Cited

U.S. PATENT DOCUMENTS

| 7,609,674 | B2 | 10/2009 | Kwon et al. | |
| 2006/0114878 | A1 | 6/2006 | Choe et al. | |
| 2007/0058665 | A1* | 3/2007 | Ho et al. | 370/447 |
| 2007/0160040 | A1 | 7/2007 | Kwon | |
| 2007/0171858 | A1 | 7/2007 | Grandhi et al. | |
| 2010/0113042 | A1* | 5/2010 | Kasslin et al. | 455/450 |

FOREIGN PATENT DOCUMENTS

| KR | 10-2006-0020561 A | 3/2006 |
| KR | 10-2006-0059072 A | 6/2006 |
| KR | 10-2007-0075226 A | 7/2007 |

* cited by examiner

*Primary Examiner* — Raj Jain
(74) *Attorney, Agent, or Firm* — Birch, Stewart, Kolasch & Birch, LLP

(57) ABSTRACT

A method and device for communicating in a contention-based communication network. According to an embodiment, the method includes obtaining, by a transmitter, an access to a channel during a transmission opportunity (TXOP) and transmitting, by the transmitter, a contention free (CF)-End frame to truncate the TXOP if the transmitter has no more data that the transmitter can send that fits within the TXOP, wherein the CF-End frame includes a duration field indicating a time required to complete the truncation of the TXOP.

6 Claims, 8 Drawing Sheets

FIG. 5

| | Frame Control | Duration | RA | TA | SP Info | FCS |
|---|---|---|---|---|---|---|
| | 510 | 520 | 530 | 540 | 550 | 560 |
| Octets: | 2 | 2 | 6 | 6 | 4 | 4 |

FIG. 6

|  | TID | Permanent | Reserved | Destination AID | SP Duration |
|---|---|---|---|---|---|
| Bits: | B0-B3 | B4 | B5-B7 | B8-B15 | B16-B31 |

METHOD AND DEVICE FOR TRANSMISSION OPPORTUNITY TRUNCATION

CROSS-REFERENCE TO RELATED APPLICATIONS

This application is a Continuation of U.S. application Ser. No. 12/473,799 filed on May 28, 2009 now U.S. Pat. No. 8,223,639, which claims the benefit of priority of U.S. Provisional Application No. 61/118,998 filed on Dec. 1, 2008, U.S. Provisional Application No. 61/157,197 filed on Mar. 3, 2009 and Korean Patent Application No. 10-2009-0040885 filed on May 11, 2009, all of which are incorporated by reference in their entirety herein.

BACKGROUND OF THE INVENTION

1. Field of the Invention

The present invention relates to a wireless local area network (WLAN), and more particularly, to a transmission opportunity truncation method in a WLAN.

2. Discussion of the Related Art

With the recent development of information communication technology, a variety of wireless communication techniques have been developed. Among these, there is a wireless LAN (WLAN) that is a technique that allows a user to wirelessly access the Internet by using a mobile terminal such as a personal digital assistant (PDA), a laptop computer, a potable multimedia player (PMP), etc. based on radio frequency technology at home or in companies or a specific service providing area.

While early WLAN technology supported a speed of 1 to 2 Mbps through frequency hopping, spread spectrum, infrared communication, etc. using a frequency of 2.4 GHz according to IEEE 802.11, recent WLAN technology has supported maximum 54 Mbps using orthogonal frequency division multiplex (OFDM). In addition, IEEE 802.11 standardizes various techniques such as quality of service (QoS) improvement, access point protocol compatibility, security enhancement, radio resource measurement, wireless access for vehicular environment, fast roaming, mesh network, interworking with external network, wireless network management, etc.

In IEEE 802.11, IEEE 802.11b uses a frequency of 2.4 GHZ and supports a communication speed of up to 11 Mbps. IEEE 802.11a commercialized after IEEE 802.11b uses a frequency of 5 GHz to reduce the influence of interference as compared to the frequency of 2.4 GHz and improves a communication speed to 54 Mbps by using OFDM. However, IEEE 802.11a has a shortcoming of a short communication distance as compared to IEEE 802.11b. Similarly to IEEE 802.11b, IEEE 802.11g uses 2.4 GHz to achieve a communication speed of 54 Mbps and meets backward compatibility, and thus it receives considerable attraction. Furthermore, IEEE 802.11g is superior to IEEE 802.11a in terms of the communication distance.

To overcome the limit of communication speed, which is a weak point of the WLAN, IEEE 802.11n has been recently established for the purpose of improving network speed and network reliability and extending wireless network operating distances. More specifically, IEEE 802.11n supports high throughput corresponding to a data processing rate of higher than 540 Mbps and is based on MIMO (Multiple Inputs Multiple Outputs) technique using multiple antennas for both a transmitter and a receiver to minimize a transmission error and optimize a data rate. Furthermore, IEEE 802.11n can use a coding method transmitting multiple repeated copies to increase data reliability and employ OFDM to increase a communication speed.

However, as WLAN has spread and applications using the WLAN have diversified, a new WLAN system for supporting throughputs higher than the by IEEE 802.11n throughput is thought to be desired. A very high throughput (VHT) WLAN system has been newly proposed in order to support a data processing rate of higher than 1 Gbps. The term VHT WLAN system is an arbitrary term. A feasibility test on a system using 4×4 MIMO and a channel bandwidth of higher than 80 MHz has been shown to provide a throughput of higher than 1 Gbps.

However, when a directional antenna is used in the IEEE 802.11 VHT system, hidden nodes (i.e., a node that cannot receive a contention free end (CF-End) frame) are frequently generated due to propagation characteristics (i.e., fading, scattering, directionality, etc). Hidden nodes do not receive the CF-End frame do not know that the the TXOP holder has transmitted the CF-End frame and thus released or truncated the TXOP. Accordingly, an improved TXOP truncation technique is required when the directional antenna is used.

SUMMARY OF THE INVENTION

According to an aspect of the present invention, there is provided a method and device for truncating a transmission opportunity by a first station that transmits frames to a second station in a WLAN system, which includes a step in which the first station transmits a first CF-End frame to a central point (CP) before a transmission opportunity (TXOP) duration expires and a step in which the CP receives the first CF-End frame and omni-directionally transmits a second CF-End frame such that third stations in the WLAN system can overhear the second CF-End frame.

According to another aspect of the present invention, there is provided a WLAN system including a first station transmitting a first CF-End frame to a CP before a transmission opportunity duration expires in order to truncate a transmission opportunity, the CP receiving the first CF-End frame from the first station and omni-directionally transmitting a second CF-End frame, and at least one third station overhearing the second CF-End frame omni-directionally transmitted from the CP and resetting a network allocation vector.

Generation of hidden nodes can be reduced in transmission opportunity truncation in a WLAN system. Accordingly, a more reliable transmission opportunity truncation process can be performed. Furthermore, the duration of the CF-End frame transmitted for transmission opportunity truncation can be controlled.

In one embodiment, there is a method and device for communicating in a contention-based communication network. The method includes upon an early termination of a previously obtained transmission opportunity (TXOP) for communications with one of a mobile device and a base station, transmitting a contention free end (CF-End) frame to the base station for further broadcasting to the network by the base station.

In another embodiment, there is a method and device for communicating in a contention-based communication system. The method includes receiving in a base station a first contention free end (CF-End) frame from a first mobile device indicating an early termination of a transmission opportunity (TXOP) previously obtained by the first mobile terminal for communications between the first mobile device and one of the base station and a second mobile device; and omnidirectionally broadcasting a second CF-End frame with a duration field having a value equal to zero.

BRIEF DESCRIPTION OF THE DRAWINGS

FIG. 5 illustrates a frame format of a CF-End frame transmitted in the transmission opportunity truncation method according to an embodiment of the present invention;

FIG. 6 illustrates an service period (SP) information field illustrated in FIG. 5;

DESCRIPTION OF EXEMPLARY EMBODIMENTS

Figure 1:
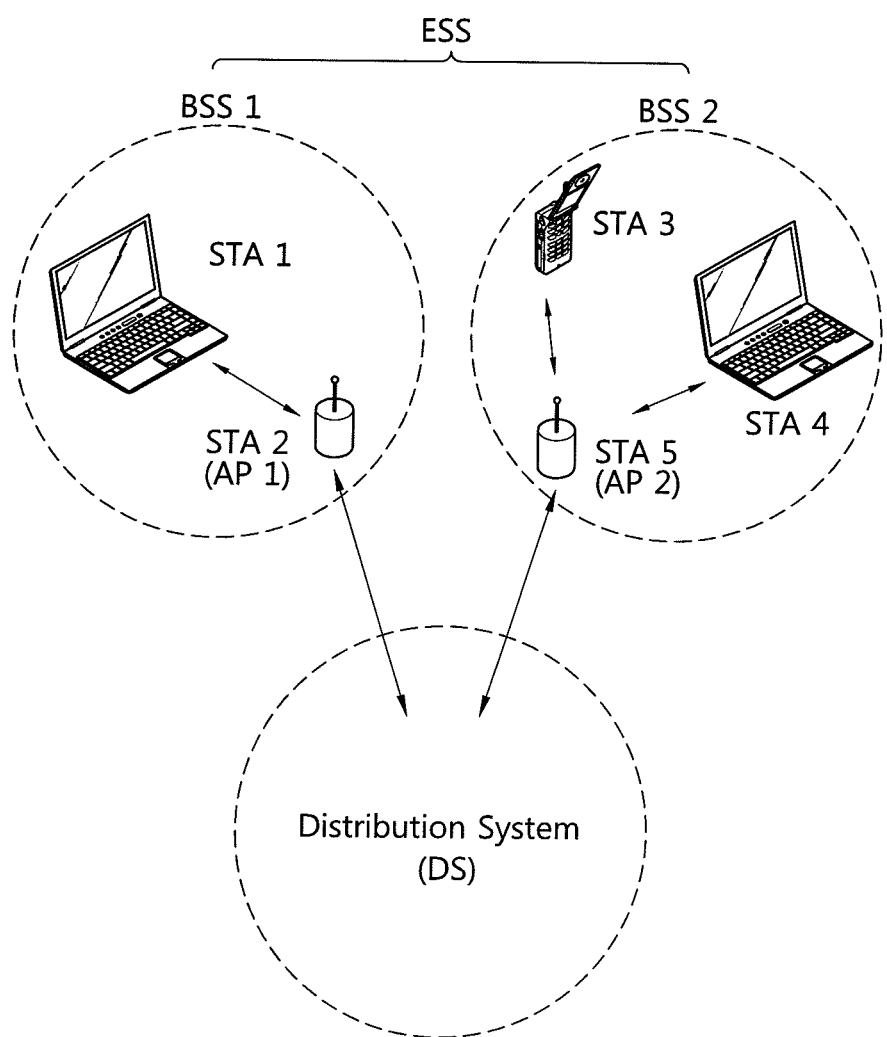
FIG. 1 illustrates a configuration of a VHT WLAN system to which an embodiment of the present invention can be applied.

FIG. 1 illustrates a configuration of a very high throughput (VHT) WLAN system to which an embodiment of the present invention can be applied.

Referring to FIG. 1, a WLAN system such as a VHT WLAN system includes at least one BSS. A BSS is a set of stations which are successfully synchronized and communicate with one another and does not represents a specific area. A BSS that supports a very high data processing rate of higher than 1 GHz in the medium access control service access point (MAC SAP), such as the BSS in the WLAN system to which an embodiment of the present invention can be applied, is referred to as a VHT BSS.

The VHT BSS can be classified into an infrastructure BSS and an independent BSS. FIG. 1 illustrates infrastructure BSSs BSS1 and BSS2.

Each infrastructure BSS includes at least one non-AP station (Non-AP STA1, Non-AP STA3 and Non-AP STA4), access points (AP STA1 and AP STA2) corresponding to stations providing a distribution service, and a distribution system (DS) connecting the multiple access points AP STA1 and AP STA2. In the infrastructure BSS, an AP station manages Non-AP stations of the BSS.

The independent BSS is a BSS can operate in an ad-hoc mode. The independent BSS has no centralized management entity because it does not include an AP VHT station. That is, non-AP stations are managed in a distributed manner in the independent BSS. All stations may be mobile stations and construct a self-contained network because access to the DS is not allowed in the independent BSS.

A station is an arbitrary functional medium including medium access control (MAC) and a physical layer interface for wireless media which conform to IEEE 802.11 and includes both AP and non-AP stations in a broad sense. A station that processes data at higher than 1 GHz in a multi-channel environment is referred to as a VHT station (VHT STA), which will be explained later. In the WLAN system to which an embodiment of the present invention can be applied, stations belonging to a BSS may be all VHT stations or include a VHT station and a legacy station (for example, an HT station conforming to IEEE 802.11n).

A station for wireless communication includes a processor, transceiver, a user interface and a display. The processor is a functional unit for generating frames to be transmitted through a wireless network or processing frames received through the wireless network and executes various functions for controlling the station. The transceiver is functionally connected to the processor and transmits/receives frames through the wireless network for the station.

Among stations, a mobile terminal operated by a user is a non-AP and a station represents a non-AP station in general. A non-AP station may be referred to as a terminal, a wireless transmit/receive unit (WTRU), user equipment (UE), a mobile station (MS), a mobile terminal or a mobile subscriber unit. A non-AP station that processes data at higher than 1 GHz in a multi-channel environment as described later is referred to as a non-AP VHT station or a simply VHT station.

An AP is a functional entity that provides access to a distribution system via a wireless medium for a station associated with the AP. In an infrastructure BSS including an AP, even non-AP stations can directly communicate with each other in case a direct link is established although communication between non-AP stations is performed via the AP in principle. The AP may be referred to as a centralized controller, a base station (BS), a node-B, a base transceiver system (BTS) or a site controller. An AP that processes data of higher than 1 GHz in a multi-channel environment as described later is referred to as a VHT AP.

Multiple infrastructure BSSs can be connected through a distribution system. The multiple infrastructure BSSs connected through the distribution system is referred to an extended service set (ESS). Stations included in an ESS can communicate with each other and a non-AP station can move from a BSS to another BSS while carrying out communication without being interrupted in the same ESS.

The distribution system is a mechanism by which an AP communicates with another AP. Through the distribution system, an AP can transmit frames for stations associated with a BSS managed by the AP, transmit frames as a certain station moves to another BSS, or transmit frames to an external network such as a wired network. The distribution system do not need to be a network and the type of the distribution system is not limited if the distribution system provides a predetermined distribution service prescribed by IEEE 802.11. For instance, the distribution system may be a wireless network such as a mesh network or a physical structure connecting APs.

Embodiments of the present invention will now be explained in detail with reference to the attached drawings. A transmission opportunity (TXOP) truncation process based on a central point (CP) in a VHT WLAN system will be explained in the following embodiments. The CP is a terminal similar to the AP in IEEE 802.11 and functions as a coordinator of a BSS.

Figure 2:
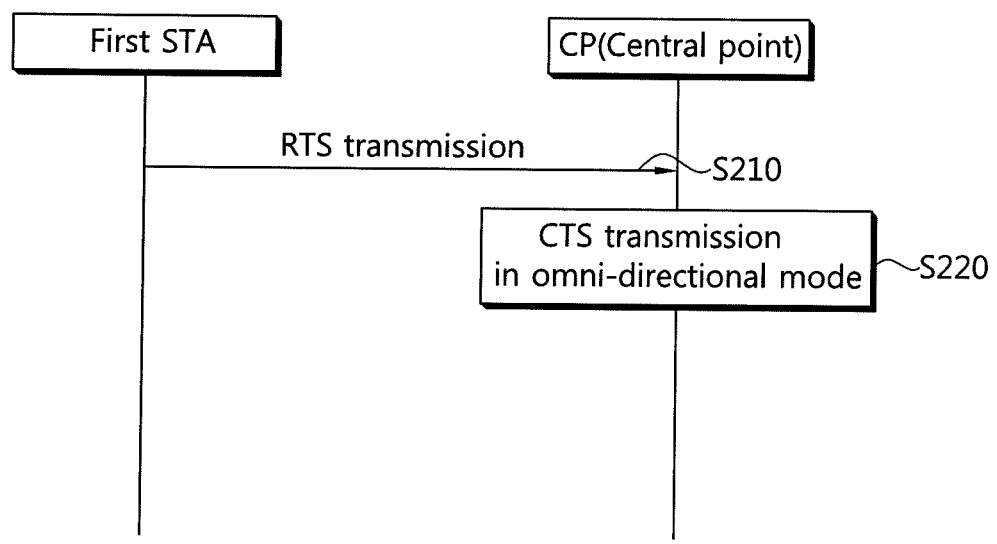
FIG. 2 illustrates an example of a transmission opportunity (TXOP) setting method in a WLAN system.

FIG. 2 illustrates an example of a transmission opportunity setting method in a WLAN system.

The transmission opportunity is obtained through an enhanced distributed channel access (EDCA) technique. The EDCA technique is a contention based channel access method. A transmission opportunity according to contention based channel access will now be briefly explained.

The hybrid coordination function (HCF) based on a IEEE 802.11 MAC protocol distributed coordination function (DCF) and point coordination function (PCF) is an access method in which a provider provides data frames to multiple users. The HCF performs EDCA (contention based channel access) and performs HCF controlled channel access (HCCA) (contention-free based channel access) using a polling mechanism.

The HCF includes a medium access mechanism for improving quality of service (QoS) and can transmit QoS data in both a contention period and a contention-free period. The DCF is a contention based asynchronous access method and the PCF is a polling based synchronous access method that periodically polls data frames such that all user can receive the data frames.

The EDCA, which is a contention based channel access method, allows differentiated media access for frames having eight user priority orders. Each frame arriving at a MAC layer from an upper layer has a specific user priority value and the MAC header of each QoS data frame includes a user priority value.

A QoS station provides four access categories for transmission of QoS data frames having priority orders. User priority orders of frames arriving at the MAC layer are respectively allocated to corresponding access categories. Accordingly, an EDCA transmission opportunity is acquired if EDCA contention is overcome.

A transmission opportunity is a time interval in case a specific station has the authority to start transmission through a wireless medium and is used to grant a specific time to a specific station such that the specific station can transmit frames in the specific time and guarantee the specific time. A transmission start time and a maximum transmission time of a transmission opportunity are determined by an AP. A station is notified of an EDCA transmission opportunity through a beacon frame.

An EDCA parameter set that is a core element of the EDCA technique is a field representing parameters with respect to traffic of user priority orders and may be represented by Table 1.

TABLE 1

| AC | CWmin | CWmax | AIFS | TXOP Limit OFDM/CCK-OFDM PHY |
|---|---|---|---|---|
| 0 | aCWmin | aCWmax | 9 | 0 |
| 1 | (aCWmin + 1)/2 − 1 | aCWmin | 6 | 0 |
| 2 | (aCWmin + 1)/4 − 1 | (aCWmin + 1)/2 − 1 | 3 | 0 |
| 3 | (aCWmin + 1)/4 − 1 | (aCWmin + 1)/2 − 1 | 2 | 0 |

Values AIFS [AC], CWmin[AC] and CWmax[AC] of the EDCA parameter set are loaded in a beacon frame according to an AP and each station is notified of the values. The priority of the corresponding frame increases as the values AIFS[AC] and CWmin[AC] decrease, and thus a channel access delay becomes short and a wider band is used in a given traffic environment. As described above, a transmission time is determined based on a transmission opportunity when a specific station starts transmission. The AP loads the EDCA parameters such as AIFS[AC], CWmin[AC] and CWmax[AC] and TXOP Limit [AC] corresponding to an EDCA TXOP time in the beacon frame and transmits the beacon frame to each station.

A process of setting a transmission opportunity acquired through EDCA in a WLAN network will now be explained with reference to FIG. 2.

Referring to FIG. 2, a first station transmits a duration field of an RTS (Request To Send) frame or a data frame to a central point in step S210. The central point receives the RTS frame in a forward receiving mode.

The central point or other stations that receive the RTS frame can be aware of a TXOP duration to be used by the first station through the RTS frame. Here, the first station may correspond to a transmitter station and a second station may correspond to a receiver station.

An RTS signal transmitted for forwarding of the RTS frame is used to check whether an area is clear. As the second station corresponding to a target station receives the RTS signal, the second station responds to the RTS signal through a CTS (Clear To Send) signal in step S220.

The first station has frames to be transmitted and starts a transmission process by sending the RTS frame. Furthermore, the first station starts the transmission process by using the data frame. In this case, the second station can be informed of the TXOP duration to be used by the first station by using the duration field of the data frame.

Here, the first station may inform the second station of the TXOP duration by using a predetermined frame including a duration field other than the RTS frame and the data frame.

Figure 3:
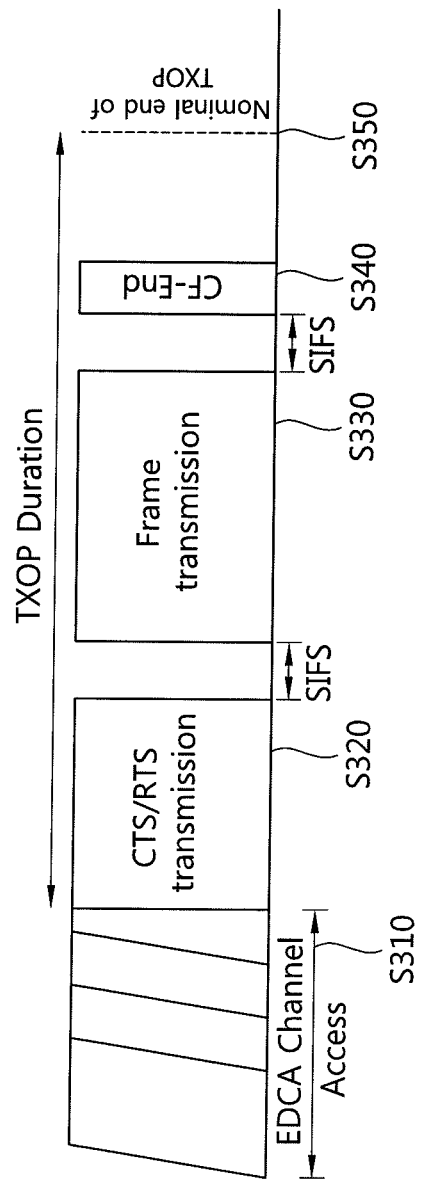
FIG. 3 illustrates an example of a transmission opportunity truncation method in a WLAN system.

FIG. 3 illustrates an example of a conventiomal transmission opportunity truncation method in a WLAN system.

IEEE 802.11n proposed a transmission opportunity truncation technique in order to efficiently use radio resources. Transmission opportunity truncation means that a station that has acquired a transmission opportunity releases the acquired transmission opportunity. A contention-free mode continues as a contention based station acquires a transmission opportunity and the contention-free mode temporarily ends as the station truncates the transmission opportunity.

A station that acquires a transmission opportunity may be referred to as a TXOP holder and has a channel access authority to transmit frames. Here, the first station corresponds to the TXOP holder that acquires a transmission opportunity and then truncates the transmission opportunity.

The TXOP holder that acquires a transmission opportunity through the EDCA technique informs other stations of the TXOP duration through an RTS frame and/or a CTS frame in steps S310 and S320.

Terminals receiving the RTS frame and the CTS frame set their network allocation vectors through the duration field of the RTS frames and/or the CTS frame. Channel access of other stations is not permitted during the TXOP duration.

The TXOP holder can transmit frames to other stations during the TXOP duration in step S330. However, in case the TXOP holder has no additional frames to be transmitted before the TXOP duration ends, the TXOP holder transmits contention free end (CF-End) frame to other stations such that the other stations can perform channel access in step S340. A station that receives the CF-End frame resets the network allocation vector thereof.

The transmission opportunity is truncated prior to a nominal exit of TXOP 350 due to transmission of the CF-End frame.

As described above, the IEEE 802.11 VHT system provides a throughput of higher than 1 Gbps at the MAC service access point (SAP). The IEEE 802.11 VHT system operates at below 6 GHz and 60 GHz. A VHT system operating at 60 GHz may use a direction antenna to extend the service coverage.

However, when a directional antenna is used in the IEEE 802.11 VHT system, hidden nodes (i.e., nodes that cannot receive the CF-End frame) are frequently generated due to propagation characteristics (i.e., fading, scattering, directionality, etc). Hidden nodes that do not receive the CF-End frame do not know that the the TXOP holder has transmitted the CF-End frame and thus has released or truncated the TXOP.

Accordingly, a more reliable TXOP truncation technique is required when the directional antenna is used.

Figure 4:
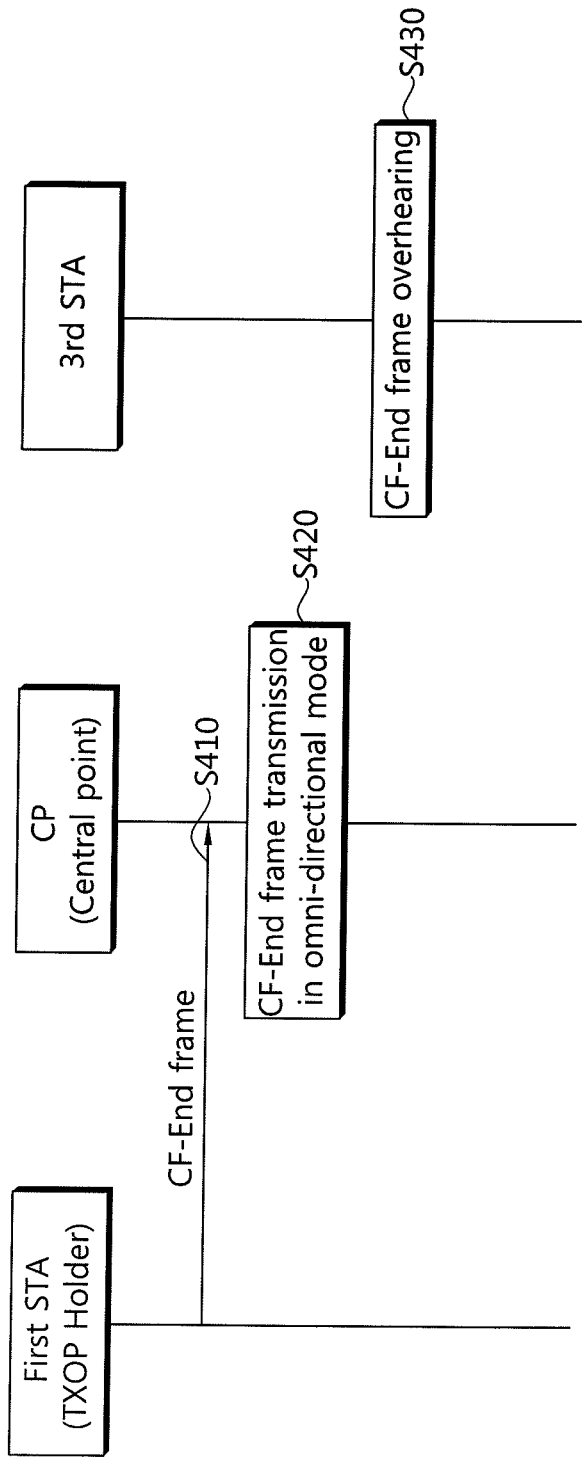
FIG. 4 illustrates a transmission opportunity truncation method according to an embodiment of the present invention.

FIG. 4 illustrates a transmission opportunity truncation method according to an embodiment of the present invention.

In the embodiment of the present invention illustrated in FIG. 4, the first station corresponds to a TXOP holder and is a non-CP station that does not function as a CP. The first station transmitting frames to the second station sends a CF-End frame to a CP when there is no frame to be transmitted even though a TXOP duration does not end in step S410. That is, the first station sends the CF-End frame to announce that the first station is truncating (ending ahead of schedule) the TXOP. The first station transmits the CF-End frame to the CP in a directional transmission mode or unicast mode.

Here, the recipient address (RA) field of the CF-End frame transmitted from the first station to the CP may be set to the MAC address of the CP and the transmission address (TA) field of the CF-End frame may be set to the MAC address of the first station corresponding to the TXOP holder.

The CP transmits the CF-End frame such that other terminals can overhear the CF-End frame in step S420. The CP may transmit the CF-End frame in an omni-directional transmission mode. That is, the CP can broadcast the CF-End frame received from the first station.

The RA field of the CF-End frame omni-directionally transmitted or broadcasted by the CP may be set to a broadcast group address and the TA field of the CF-End frame may be set to the MAC address of the CP.

While the CF-End frame omni-directionally transmitted or broadcasted by the CP is transmitted with the goal that all of the third stations included in the network can overhear the CF-End frame, a hidden node (corresponding to a station that cannot overhear the CF-end frame due to propagation conditions) may exist. However, the rate of generating hidden nodes can be reduced and the reliability of CF-End frame transmission can be improved when the CF-End frame is omni-directionally transmitted or broadcasted according to the current embodiment of the present invention as compared to a conventional CF-End frame transmission method.

The third stations overhearing the CF-End frame transmitted by the CP reset their network allocation vectors to update the network allocation vectors in step S430. Then, the third stations can attempt to perform channel access via EDCA or another process. Here, the CF-End frame that the first STA transmits may be referred to as a first CF-End frame. And the CF-End frame that the CP which received the first CF-End frame broadcasts or transmits in omni-directional mode may be referred to as a second CF-End frame. The first STA has transmitted the first CF-End frame but may not receive the second CF-End frame from the CP. In this case, the first STA may regard the TXOP truncation as truncation failure. In order to decide whether first STA fail or not in the TXOP truncation, the first STA can use a timer. Regarding the TXOP truncation as a truncation failure, the first STA transmit the first CF-End frame to the CP again.

FIG. 5 illustrates a frame format of the CF-End frame transmitted in the transmission opportunity truncation method according to an embodiment of the present invention and FIG. 6 illustrates a service period (SP) information field illustrated in FIG. 5.

According to the frame format of the CF-End frame, illustrated in FIG. 5, the CF-End frame may include a frame control field, a duration field, a recipient address (RA) field, a transmission address (TA) field, a service period (SP) information field and a frame check sequence (FCS) field.

1. Frame Control Field

The frame control field may include a plurality subfields. The subfields include a protocol version field, a type field, a subtype field, a To DS field, a From DS field, a more fragments field, a retry field, a power management field, a more data field, a protected frame field and an order field.

The frame control field is described in more detail in clause 7.1.3.1 of Part 11: Wireless LAN Medium Access Control (MAC) and Physical Layer (PHY) specifications of Draft Standard for Information Technology-Telecommunications and information exchange between systems-local and metropolitan area networks-specific requirements of IEEE P802.11-REVma™/D9.0 (Revision of IEEE Std 802.11-1999), the entire contents of which are incorporated herein by reference.

2. Duration Field

The duration field of the CF-End frame can be set to a time required until a transmission opportunity truncation sequence is finished. The duration of the CF-End frame can be calculated according to Equation 1.

$$\text{Duration} = (i-1) * (\text{CF-End}_{duration} + \text{SIFS}_{duration}) \quad [\text{Equation 1}]$$

where i=1, 2 or 3, and where SIFS is a Short Inter-Frame Space.

In Equation 1, i may be a number representing the CF-End frame reversely in the transmission opportunity truncation process. For instance, a CF-End frame with i=1 may be the CF-End frame finally transmitted in the transmission opportunity truncation process. Furthermore, the CF-End frame with i=1 may be a CF-End frame transmitted by a CP and a CF-End frame with i=2 may be a CF-End frame transmitted by the first station. Thus, the CP that is truncating a TXOP must verify that a time remaining in the TXOP exceeds the Duration=(i−1)*(CF-End+SIFS), where i=2. Otherwise, the TXOP may be allowed to expire at its scheduled time. The CP transmits that CF-End frame immediately with the duration field set to zero (i.e., corresponding to i=1).

Alternatively, before the CP relays the CF-End Frame, if the CF-End frame is not immediately retransmitted, the CP may first verify that a time remaining in the TXOP exceeds the Duration=(i−1)*(CF-End+SIFS), where i=1. Otherwise, the TXOP may be allowed to expire at its scheduled time.

That is, according to an embodiment of the present invention, the duration field is not set to zero unconditionally and may have a value depending on the transmitter. Accordingly, a transmission opportunity is not unconditionally truncated at the same time when the CF-End frame is transmitted and the transmission opportunity is truncated after the CF-End frame transmitted from a station to a CP continues for a predetermined time so as to control a truncation time.

In summary, the station wishing to truncate the TXOP may transmit a CF-End frame to a CP for further relay to the network, provided that the remaining duration in the TXOP is long enough to transmit this frame. Otherwise, the station just waits until the TxOP naturally expires. By transmitting the CF-End frame, the station is explicitly indicating the completion of its TXOP. The CP that receives an CF-End frame addressed to it shall respond by transmitting a second CF-End frame after at least one SIFS interval using a transmit mode that is receivable by all STAs in the network, provided that the remaining time in the TXOP is long enough to transmit this frame/frames. That is, a CP may relay the second CF-End frame to the network or other stations specifically during a TXOP, provided that the remaining duration in the TXOP is long enough to transmit this frame/frames. The CF-End frame may be transmitted by the CP using a transmit mode (e.g., omni-directionally) that is receivable by all STAs in the network.

3. RA Field

While the RA field of an RTS frame is a station address, the RA field of a CF-End frame is the address of a station or a CP which directly receives the CF-End frame. Accordingly, the RA field of the CF-End frame transmitted from the first station to the CP represents the MAC address of the CP.

Furthermore, the RA field of the CF-End frame transmitted from the CP represents a group address corresponding to third stations receiving the CF-End frame. Particularly, in case the CP broadcasts the CF-End frame, the RA field of the CF-End frame corresponds to a broadcast group address.

4. TA Field

The TA field is the address of a station that transmits a CF-End frame. Accordingly, the TA field of the CF-End frame transmitted from the first station to the CP corresponds to the address of the first station and the TA field of the CF-End frame transmitted from the CP corresponds to the MAC address of the CP.

Here, the CF-End frame transmitted from the first station may be referred to as a first CF-End frame and the CF-End frame omni-directionally transmitted or broadcasted from the CP may be referred to as a second CF-End frame. Accordingly, the first CF-End frame represents the CF-End frame transmitted from the first station to the CP and the second CF-End frame represents the CF-End frame omni-directionally transmitted from the CP and overheard by the third stations.

5. SP Information Field

A service period (SP) corresponds to a time during which at least one downlink unicast frame is transmitted to a station and/or a continuous time granted to one or more stations having the same transmission opportunity. The SP may be scheduled or not be scheduled. In a single non-AP station or a non-CP station, there is a single activated SP.

The SP information field includes a TID field, a permanent field, a reserved field, a destination AID field and an SP duration field.

6. FCS Field

Stations can validate received frames by using a FCS.

Figure 7:
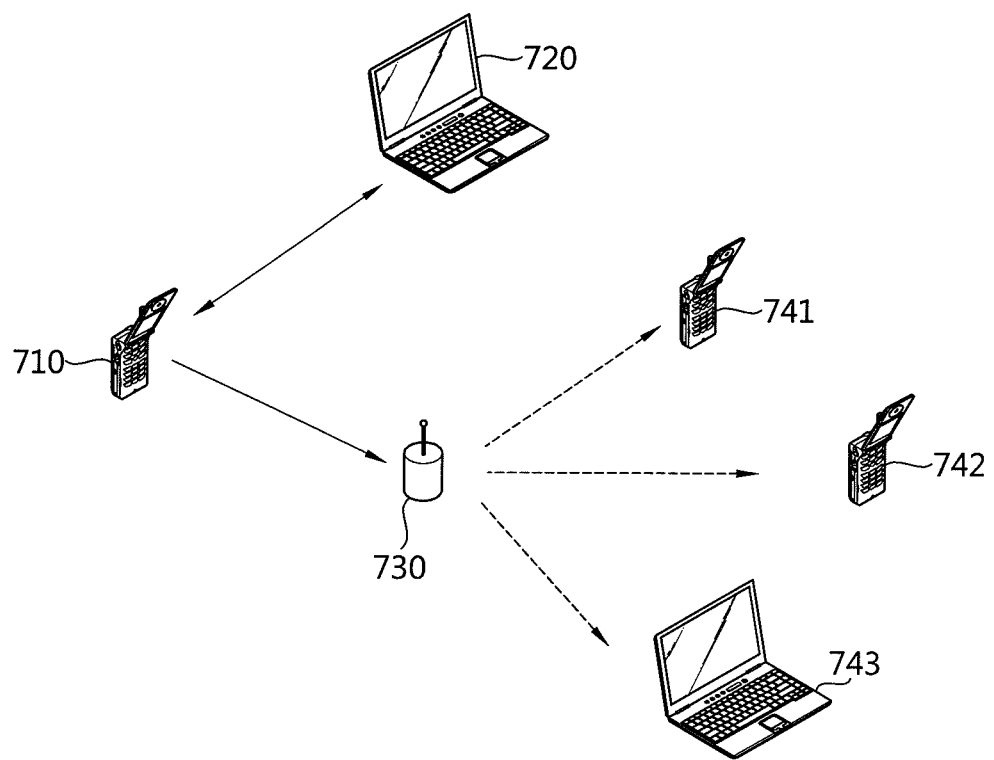
FIG. 7 illustrates a configuration of a VHT WLAN system in which the transmission opportunity truncation method according to an embodiment of the present invention is performed.

FIG. 7 illustrates a configuration of a VHT WLAN system in which the transmission opportunity truncation method according to an embodiment of the present invention is performed. The VHT WLAN system includes a first station 710, a second station 720, a CP 730 and one or more third stations 741, 742 and 743.

The first station 710 acquires a transmission opportunity through a contention based channel access process and transmits frames to the second station 720 during the duration of the acquired transmission opportunity. When there is no frame to be transmitted although the duration does not end yet, the first station 710 may transmit the above-described CF-End frame to the CP 730 to truncate the transmission opportunity during the duration. Here, the CF-End frame transmitted from the first station 710 corresponds to the first CF-End frame.

The first station 710 may transmit the CF-end frame to the CP 730 in the unicast mode. Then, the CP 730 re-transmits the CF-End frame. At this time, the CP 730 transmits the CF-End frame such that other stations including the second station 720 and the third stations 741, 742 and 743 can overhear the CF-End frame. That is, the CP 730 can transmit the CF-End frame in the omni-direction transmission or broadcasting mode. The CF-End frame transmitted from the CP 730 corresponds to the second CF-End frame.

The CF-End frame may include an RA field, a TA field and a duration field, which is described above with reference to FIGS. 4 and 5. The duration field is set to a value that is not zero.

Particularly, the first station 710 may set the RA field of the first CF-End frame to the MAC address of the CP 730 and set the TA field of the first CF-End frame to the address of the first station 710. The CP 730 may set the RA field of the second CF-End frame to a broadcasting group address corresponding to omni-directional transmission or broadcasting and set the TA field of the second CF-End frame to the MAC address of the CP 730.

The third stations 741, 742 and 743 overhearing the CF-End frame transmitted from the CP 730 may reset their network allocation vectors and attempt to perform channel access in a contention based manner.

Figure 8:
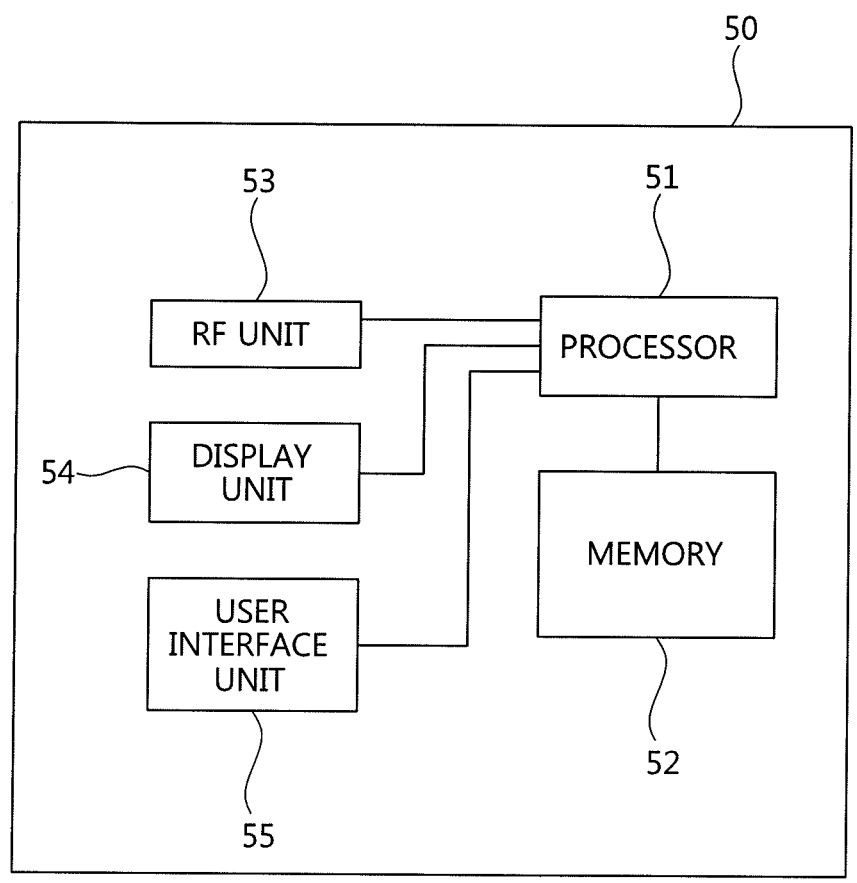
FIG. 8 illustrates an exemplary transceiver that may be either a mobile terminal or a base station.

FIG. 8 is a block diagram showing constitutional elements of a device 50, that can be either first station 710 or a CP 730 of FIG. 7, and that can perform the methods described above. Device 50 includes a processor 51, a memory 52, a radio frequency (RF) unit 53, a display unit 54, and a user interface unit 55. The processor 51 implements the methods described above The memory 52 is coupled to the processor 51 and stores an operating system, applications, and general files. If device 50 is a UE, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

The embodiments of the present invention can be implemented in a microprocessor, a controller, a microcontroller a processor such as ASIC (Application Specific Integrated Circuit) or a processor of the terminal illustrated in FIG. 8 according to software or program codes coded to execute the aforementioned methods. The design, development and implementation of the codes can be easily construed by those skilled in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for communicating in a contention-based communication network, the method comprising:
   obtaining, by a transmitter, an access to a channel during a transmission opportunity (TXOP); and
   transmitting, by the transmitter, a contention free (CF)-End frame to truncate the TXOP if the transmitter has no more data that the transmitter can send that fits within the TXOP,
   wherein the CF-End frame includes a duration field indicating a time required to complete the truncation of the TXOP, and
   wherein a value k of the duration field is computed as:

$$k=(i-1)\times(tcf+s)$$

where i denotes 1, 2 or 3, tcf denotes a transmission time of the CF-End frame and s denotes a Short Inter-Frame Space (SIFS).

2. The method of claim 1, wherein the access to a channel is obtained by using enhanced distributed channel access (EDCA).

3. The method of claim 1, wherein the channel uses frequencies above 6 GHz.

4. A transmitter comprising:
a radio frequency unit configured to transmit a radio signal; and
a processor operably coupled with radio frequency unit and configured to:
obtain an access to a channel during a transmission opportunity (TXOP); and
instruct the radio frequency unit to transmit a contention free (CF)-End frame to truncate the TXOP if the apparatus has no more data that the apparatus can send that fits within the TXOP,
wherein the CF-End frame includes a duration field indicating a time required to complete the truncation of the TXOP, and
wherein a value k of the duration field is computed as:

$$k = (i-1) \times (tcf + s)$$

where i denotes 1, 2 or 3, tcf denotes a transmission time of the CF-End frame and s denotes a Short Inter-Frame Space (SIFS).

5. The transmitter of claim 4, wherein the processor is configured to obtain the access to a channel by using enhanced distributed channel access (EDCA).

6. The transmitter of claim 4, wherein the channel uses frequencies above 6 GHz.

* * * * *